United States Patent [19]
Pickett et al.

[11] Patent Number: 5,872,970
[45] Date of Patent: Feb. 16, 1999

[54] INTEGRATED CROSS-PLATFORM BATCH MANAGEMENT SYSTEM

[75] Inventors: Christopher C. Pickett; John F. Baker; Robert V. Hardisty, IV; Anthony A. Main, all of Colorado Springs; Gilbert O. Kindt, Jr., Manitou Springs; Elizabeth A. Mackey, Colorado Springs, all of Colo.

[73] Assignee: MCIWORLDCOM, Inc., Ga.

[21] Appl. No.: 672,813

[22] Filed: Jun. 28, 1996

[51] Int. Cl.$^6$ ........................................ G06F 15/16
[52] U.S. Cl. .................. 395/671; 395/672; 395/182.13; 395/185.1
[58] Field of Search ................ 395/671, 185.1, 395/182.13, 672

[56] References Cited

U.S. PATENT DOCUMENTS

| | | | |
|---|---|---|---|
| 4,782,442 | 11/1988 | Kodima et al. | 364/200 |
| 4,955,070 | 9/1990 | Welsh et al. | 455/2 |
| 4,996,703 | 2/1991 | Gray | 379/40 |
| 5,036,852 | 8/1991 | Leishman | 128/630 |
| 5,065,140 | 11/1991 | Neuburger | 340/634 |
| 5,291,492 | 3/1994 | Andrews et al. | 370/110.1 |
| 5,374,951 | 12/1994 | Welsh | 348/4 |
| 5,381,470 | 1/1995 | Cambray et al. | 379/216 |
| 5,475,813 | 12/1995 | Cieslak et al. | 395/182.02 |
| 5,748,884 | 5/1998 | Royce et al. | 395/185.01 |
| 5,771,343 | 6/1998 | Hafner et al. | 395/182.02 |

Primary Examiner—Lucien U. Toplu

[57] ABSTRACT

A system and method for automating the process of monitoring batch production jobs, being executed on a plurality of computer systems, for abnormal ends (ABENDs) and exceptions, and for integrating a plurality of tools needed to monitor and fix jobs to provide Production Operations personnel a single, integrated environment for performing these tasks. The present invention automates the monitoring process by searching for exceptions and reporting them to the user. The present invention comprises a computer workstation, operating in a client/server environment, connected to multiple logical data centers via a standard data communications link to provide the user with a single interface for multiple platforms (MVS, UNIX, OS/2, etc.) and to continuously monitor all specified jobs at each logical data center for ABENDs and exceptions. The present invention also provides a single point of access to the various tools needed on multiple logical data centers, such as IOF, ISPF, CA-7, and CA-11 to identify and fix ABENDs and exceptions.

11 Claims, 5 Drawing Sheets

INTEGRATED CROSS-PLATFORM BATCH MANAGEMENT SYSTEM

CROSS-REFERENCE TO RELATED APPLICATIONS

This application is of common assignee and makes reference to the invention disclosed in the following application.

"Autonotification," Ser. No. 08/663,401 incorporated herein by reference.

BACKGROUND OF THE INVENTION

1. Field of the Invention

The present invention relates generally to network communications, and more particularly to automating a process for monitoring the occurrence of exceptions and abnormal ends while processing batch jobs on computer systems.

2. Related Art

Business enterprises that utilize mainframe and distributed computers for data processing have a critical need to monitor executable programs to ensure successful completion of the programs. Commonly, such processing is achieved using batch jobs that run on Multiple Virtual System (MVS) mainframe computers. Many of these programs perform critical business functions, such as operations or customer billing. Such jobs are known as production jobs, since they are executed in a production environment rather than a test or development environment.

It is not uncommon for a batch production job to encounter a problem during processing and terminate unexpectedly. This is known as an ABEND or an Abnormal End. A job ABEND may be initiated by the job itself, by a user, or by the operating system if the job has run out of control. A job may ABEND for a number of reasons, such as encountering a shortage of virtual memory. It is also not uncommon for a batch job to complete processing, but encounter an error in processing and issue a return code indicating so. Such an occurrence is known as an exception.

If a production job ABENDs or completes as an exception, it is crucial for the problem that caused the ABEND or exception to be fixed and the production job restarted, so that the critical business functions may proceed. Many enterprises employ Production Operations personnel to monitor production jobs for ABENDs and exceptions, analyze the cause of the problem, implement a fix, and resubmit the job for processing.

Production Operations personnel use a number of tools to accomplish these tasks. They monitor production jobs for ABENDs and exceptions using conventional products, such as CA-7, developed by Computer Associates (CA). When an ABEND or exception is found, they may view system log files and error messages for problem analysis through an IBM mainframe facility known as Interactive Output Facility (IOF). Often the problem may be fixed by changing the Job Control Language (JCL) of the job. JCL specifies to the operating system (MVS) the requirements for running a job. JCL can be edited by the Production Operations personnel in another IBM facility known as Interactive System Productivity Facility (ISPF). Other fixes may be implemented using another CA product known as CA-11. CA-11 can also be used to restart the job.

Other tools are available to Production Operations personnel to resolve problems. These may include electronic mail (e-mail) and paging systems for notifying appropriate personnel of problems, and Problem Management Systems (PMS) for recording and tracking problems.

Thus, a number of different tools are used by Production Operations personnel to accomplish the tasks of monitoring, analyzing, fixing, and restarting jobs, as well as notifying key personnel, if necessary. For a typical business enterprise, such as MCI Telecommunications, a staff of personnel must monitor about 900,000 production jobs a month on a 7 days/week, 24 hours/day schedule. These jobs span across twelve (12) logical data centers. Of the 900,000 production jobs, it is typical for about 4% (or about 36,000) of the production jobs to ABEND. Using a number of different systems and tools makes the tasks of Production Operations personnel extremely difficult, time consuming, and prone to human error.

Other aspects of the process add to the difficulty. For example, the monitoring process is cyclical; total jobs are monitored sequentially, so that when the end of the sequence is reached, monitoring continues with the beginning of the sequence. If a job ABENDs shortly after it has been monitored, it may be 60–90 minutes before monitoring returns to that job in sequence and attention may be given to it. This timespan can introduce an unacceptable delay in the critical execution of production jobs. These delays could be minimized if proactive notification of job ABENDs and exceptions were automated.

In addition, enterprises, such as MCI, are currently implementing additional computing platforms for their data processing needs. Such platforms may include mid-range components running with UNIX operating systems. This further complicates the ability of Production Operations personnel to perform their tasks in that they must not only learn to interface with these new platforms, but they will also be required to use additional tools to perform their tasks. Also, faster platforms may increase the number of production jobs that require monitoring. Clearly, there is a need to automate the process of monitoring jobs, and to integrate the multiple environments in which an analyst must work in order to utilize the various tools needed for analyzing, fixing, and restarting jobs.

SUMMARY OF THE INVENTION

Briefly stated, the present invention is directed to a system and method for automating the process of monitoring batch production jobs, executed on a plurality of computer systems, for abnormal ends (ABENDs) and exceptions. The present invention integrates a plurality of tools needed to monitor, analyze, fix, and restart batch production jobs. The present invention provides Production Operations personnel a single, integrated environment for performing these tasks. The present invention automates the monitoring process by searching for exceptions and reporting them to the user, thereby removing the error-prone manual method of monitoring.

The present invention comprises a computer workstation, operating in a client/server environment, connected to multiple data centers via a standard data communications link to provide the user with a single interface for multiple platforms (MVS, UNIX, OS/2, etc.), and to continuously monitor all specified jobs at each data center for ABENDs and exceptions. The present invention also provides a single point of access to the various tools needed on multiple data centers, such as IOF, ISPF, a job exception system (CA-7), and a scheduling system (CA-11). An additional aspect of the present invention is the ability to report the occurrence of an ABEND or an exception to other key personnel, such as the program developer.

The present invention allows Production Control and Operations personnel to perform their tasks with greater efficiency and accuracy by removing human error from the monitoring process. Increased efficiency allows for a greater number of jobs on multiple platforms to be monitored by a lesser number of people. Increased accuracy allows exceptions and ABENDs to be identified, fixed, and restarted quicker, thereby contributing to the on-time completion of critical business processes.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENT

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

Overview of the Invention

The present invention is directed to a system and method for automating the process of monitoring batch production jobs, executed on a plurality of computer systems, for abnormal ends (ABENDs) and exceptions. The present invention comprises a computer workstation, operating in a client/server environment, connected to multiple data centers via a standard data communications link to provide the user with a single interface for multiple platforms (MVS, UNIX, OS/2, etc.), and to continuously monitor all specified jobs at each data center for ABENDs and exceptions. The present invention also provides a single point of access to the various tools needed on multiple data centers, such as a job exception system (CA-7), a job scheduling system (CA-11), a facility for viewing system log files and error messages for problem analysis (IOF), and a facility for performing editing functions (ISPF). An additional aspect of the present invention is the ability to report the occurrence of an ABEND or an exception to other key personnel, such as the program developer.

The present invention automates job exception system monitoring functions by providing a user-friendly graphical user interface (GUI) that allows a user to retrieve a list of exceptions from all data centers or those data centers specified by the user. Once the user has retrieved an exceptions list, the user can obtain detailed information concerning a particular job resulting in an ABEND or exception and perform actions on that job, such as view system log files and error messages for problem analysis for the job, edit the JCL for the job, review documents pertaining to the job, notify additional personnel concerning the job, restart the job, etc.

Implementation of the Invention

Figure 1:
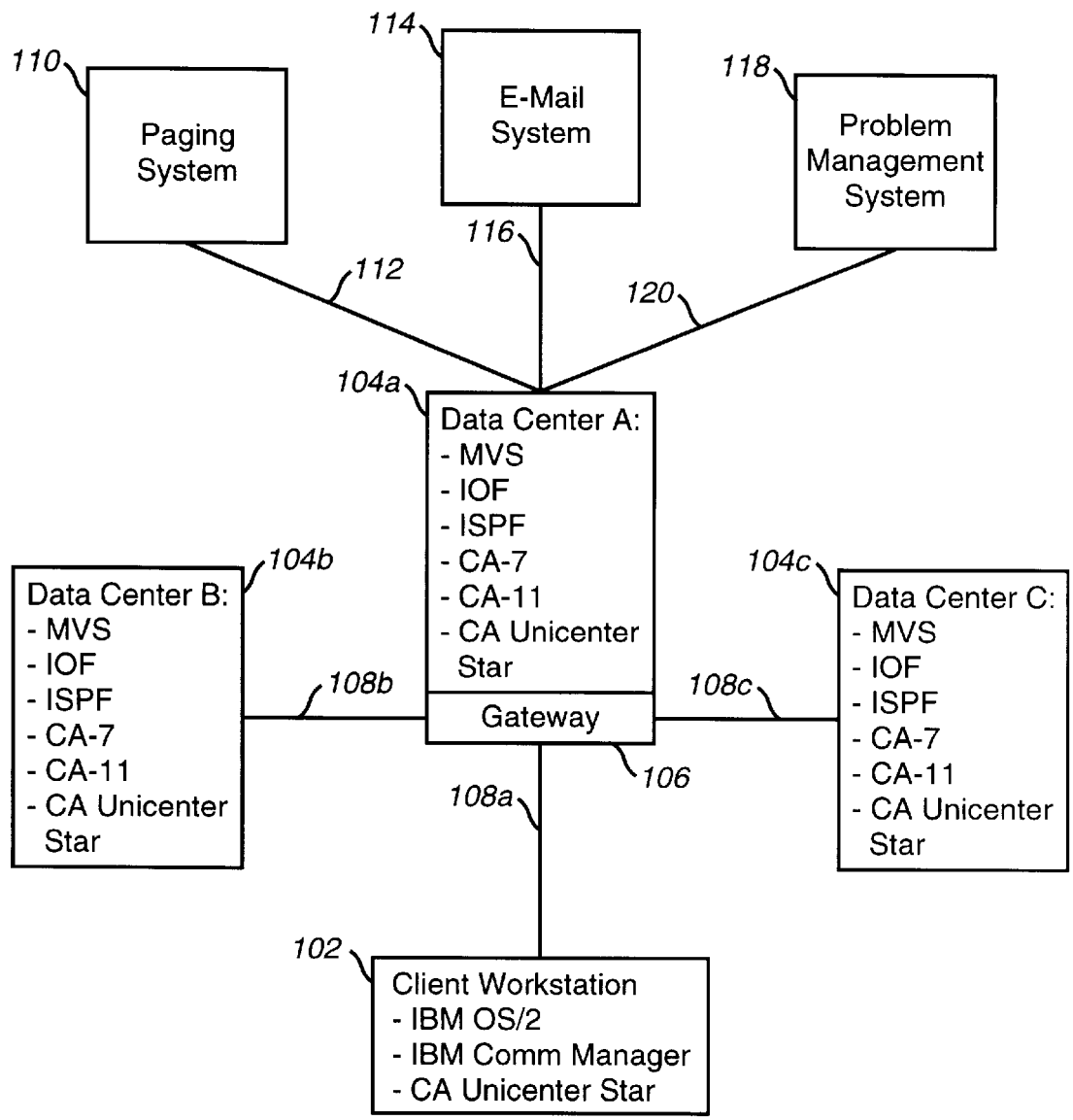
FIG. 1 is a block diagram of the systems architecture of the invention.

An embodiment of the present invention is shown in FIG. 1. The present invention operates on a client workstation 102. In a preferred embodiment, the client workstation 102 is equipped with an operating system, such as IBM OS/2, a communications manager, such as IBM Communications Manager, and a software agent to carry and translate commands from the client workstation 102 to other components of the network, such as CA's Unicenter Star product. The communications manager provides the client workstation 102 with the ability to access, via conventional 3270 terminal emulation, a plurality of data centers 104a . . . 104c. The software agent carries and translates commands from the client workstation 102 to other components located at data centers 104a . . . 104c that allow the Production Operations personnel to perform their tasks. Thus, client workstation 102 provides the user (Production Operations personnel) with an interface to the data centers and the various tools they require to perform their tasks. For illustrative purposes only, three data centers are shown. For typical enterprise operations, such as those of MCI Telecommunications, many more data centers can be supported by the invention.

A data center consists of a mainframe computer (not shown), such as an IBM 3090 processor, and the various facilities to support it. Each mainframe computer may be partitioned into logical partitions (LPARs). Partitioning the mainframe into logical units or partitions is well known to persons skilled in the relevant arts. Each mainframe LPAR is treated as an individual computer, with a number of batch jobs being processed on each one.

Multiple data center communication sessions with the client workstation 102 are achieved with an application gateway 106. The application gateway 106 is a facility on each data center 104a . . . 104c that provides access to other remote data centers. For illustrative purposes, the application gateway 106 on data center 104a is used. Connectivity from the client workstation 102 to data center 104a is via communications link 108a with System Network Architecture (SNA) protocol. Connectivity to data center 104b and data center 104c is via similar communications links 108b and 108c with System Network Architecture (SNA) protocol. The links 108a . . . 108c with SNA protocol, data centers 104a . . . 104c, and the application gateway 106 are well known components to persons skilled in the relevant arts.

Each data center 104a . . . 104c is equipped with a conventional operating system, such as the IBM Multiple Virtual System (MVS) operating system. Each data center 104a . . . 104c is also equipped with various facilities, such as an IBM Interactive Output Facility (IOF) and an IBM Interactive System Productivity Facility (ISPF); and various products used to monitor, fix, and restart production jobs resulting in ABENDs and exceptions, such as Computer Associates (CA) CA-7, CA-11, and CA Unicenter Star. The CA Unicenter Star product on the client workstation 102 and data centers 104a . . . 104c is a software agent that carries and translates commands from the Workstation 102 to the CA-7 and CA-11 products on the Data Centers 104*a* . . . 104*c*.

Many actions required on a job that has ABENDed or ended with an exception must be performed by personnel other than Production Operation personnel. Thus, a means of notification to these personnel is necessary. Each data center 104*a* . . . 104*c* is connected to a Paging System 110, an E-Mail System 114, and a Problem Management System (PMS) 118 to provide such notification. Connectivity is provided by standard data communication links (112, 116, and 120). The PMR 118 may reside in an external system as illustrated, or alternatively it may reside within one or more data centers 104*a* . . . 104*c*. The Production Operation personnel can contact key personnel concerning a particular job using a page, an e-mail or issuing a problem management record (PMR). Alternatively, the present invention can be used in conjunction with the Autonotification System. The process of automatically notifying various personnel when an ABEND or an exception occurs is disclosed in copending application entitled "Autonotification," application Ser. No. 08/663,401, (Atty. Docket No. COS-94-036 (1575.0340000)) referred to above.

For simplicity of illustration, connectivity to the Paging System 110, the E-Mail System 114, and the Problem Management System 118 is illustrated for data center 104*a* only. Data center 104*b* and data center 104*c* are also connected to the Paging System 110, the E-Mail System 114, and the Problem Management System 118.

Figure 3:
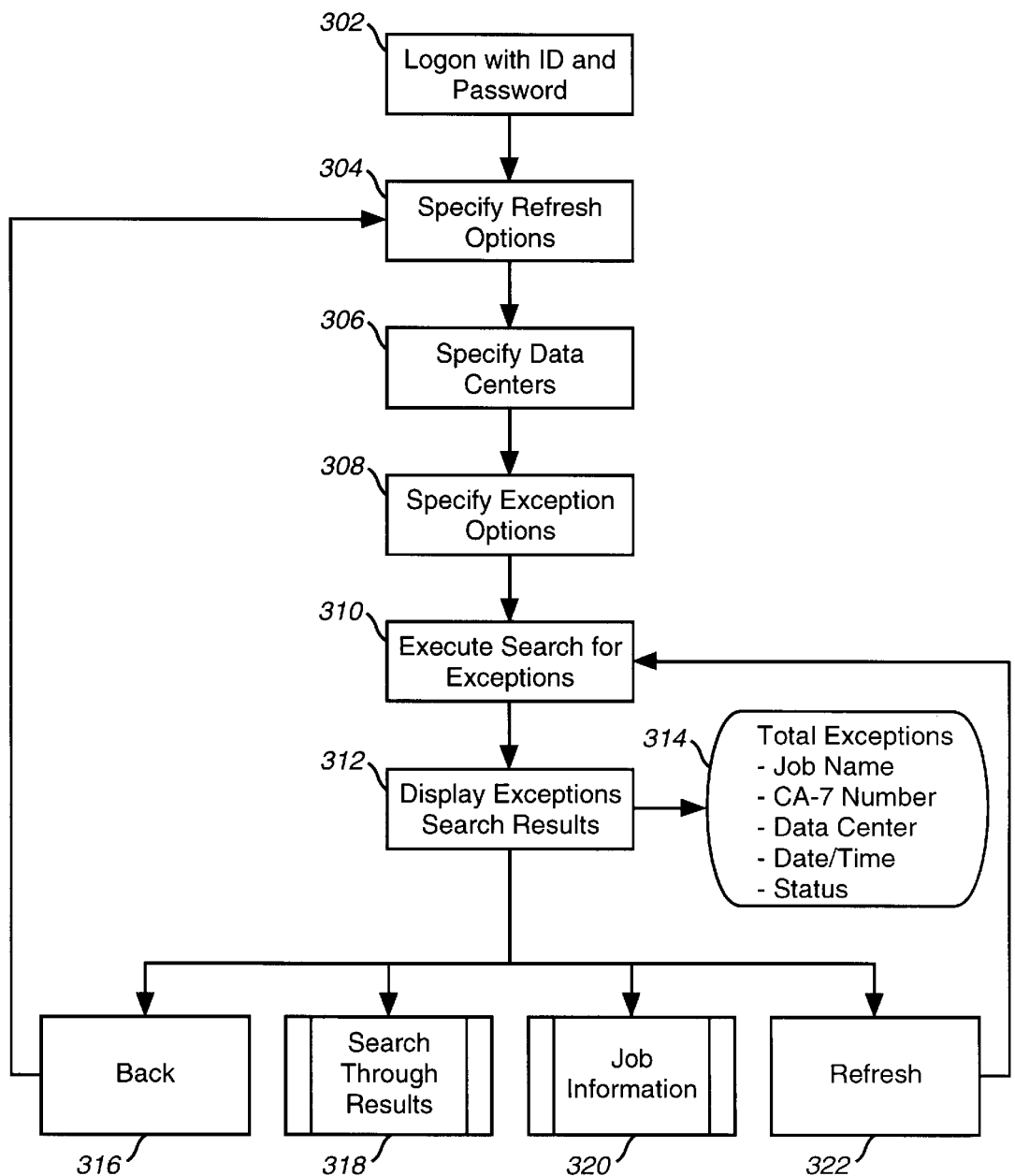
FIG. 3 is a process flowchart illustrating the main operation of the present invention.
Figure 4:
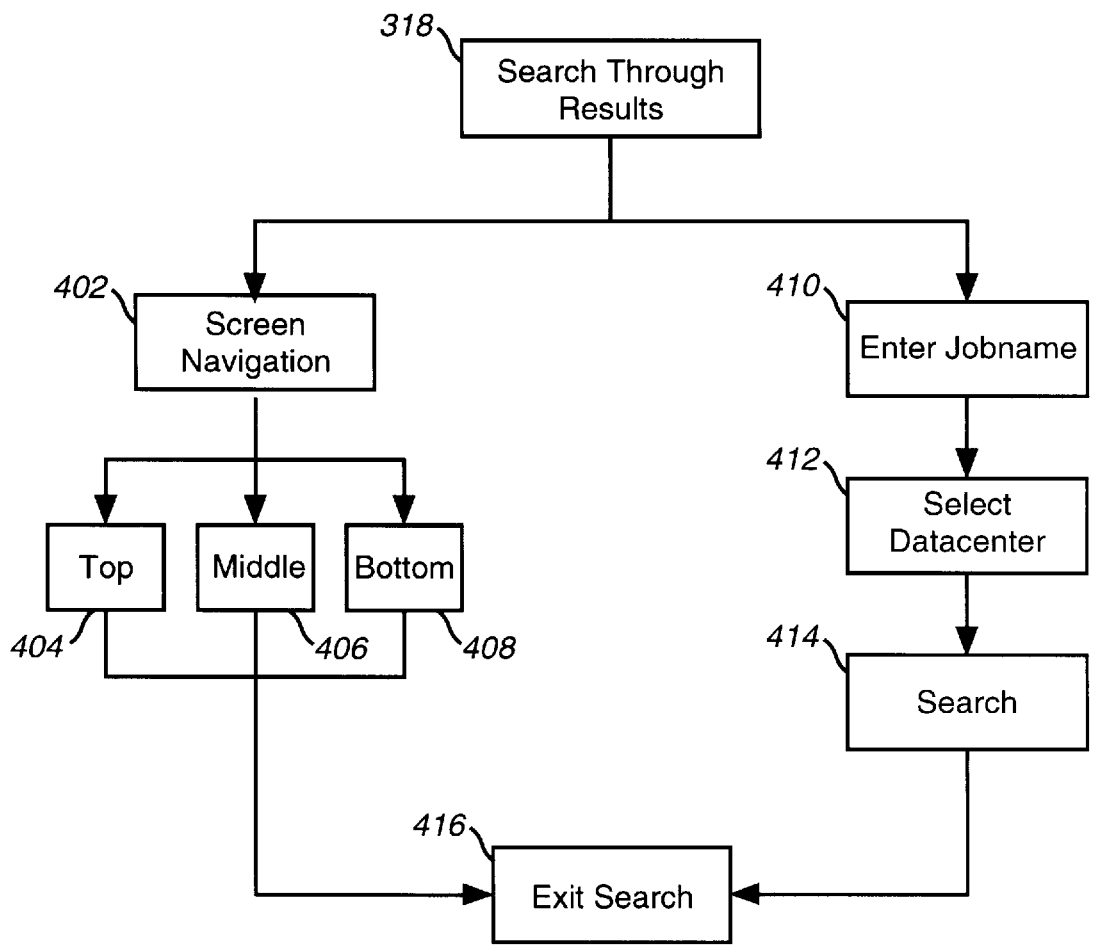
FIG. 4 is a process flowchart illustrating how to search through a list of exceptions using the present invention.
Figure 5:
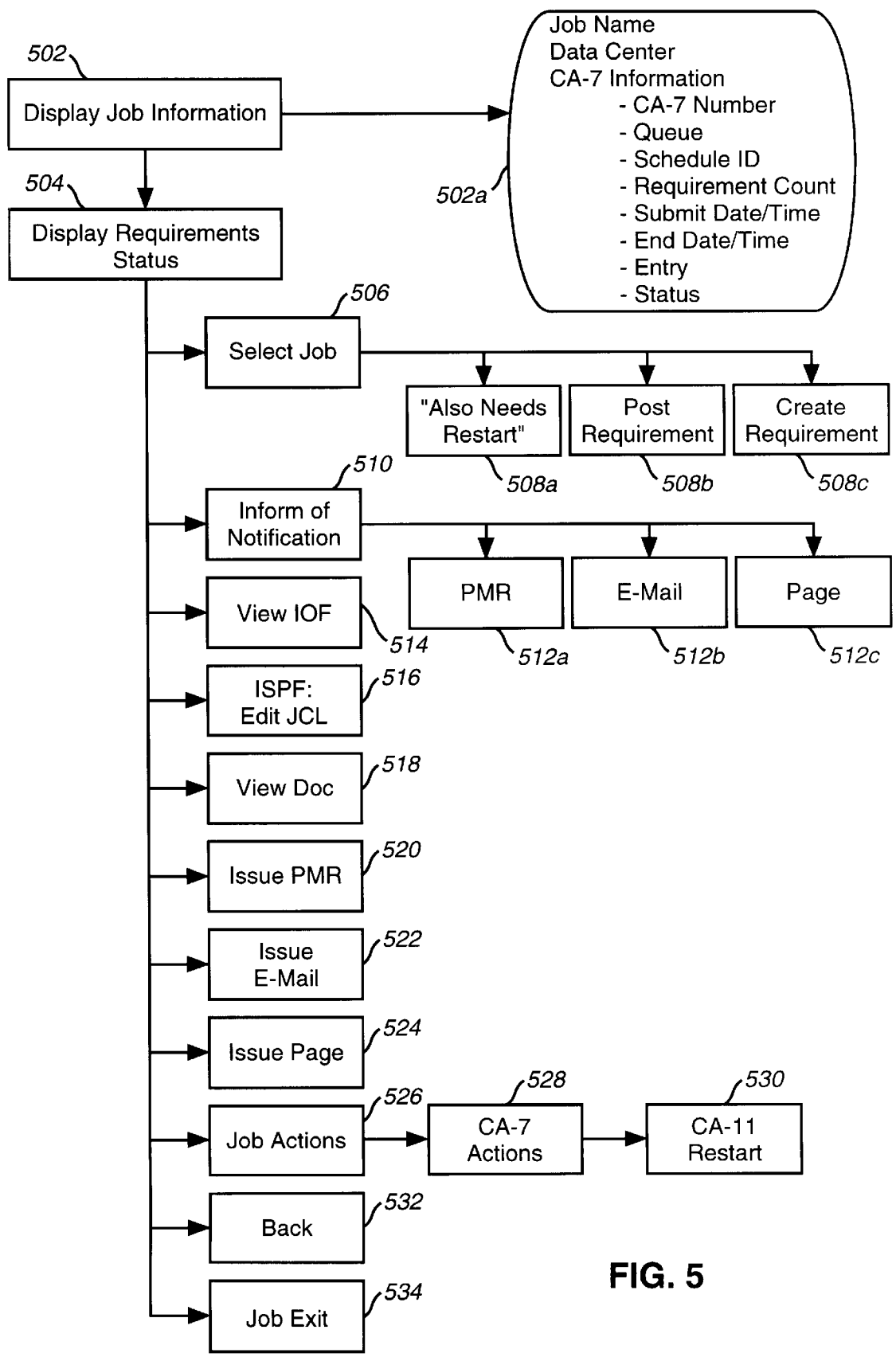
FIG. 5 is a process flowchart illustrating the performance of a detailed job search using the present invention.

The present invention provides the Production Operations personnel (user), operating the client workstation 102, with a single interface to IOF, ISPF, products to monitor exceptions and ABENDs and restart jobs, such as CA-7 and CA-11, Paging System 110, E-Mail System 114 and PMR 118 to perform their tasks. The operation of the present invention in performing the tasks of the Production Operations personnel is illustrated in FIGS. 3–5.

Figure 2:
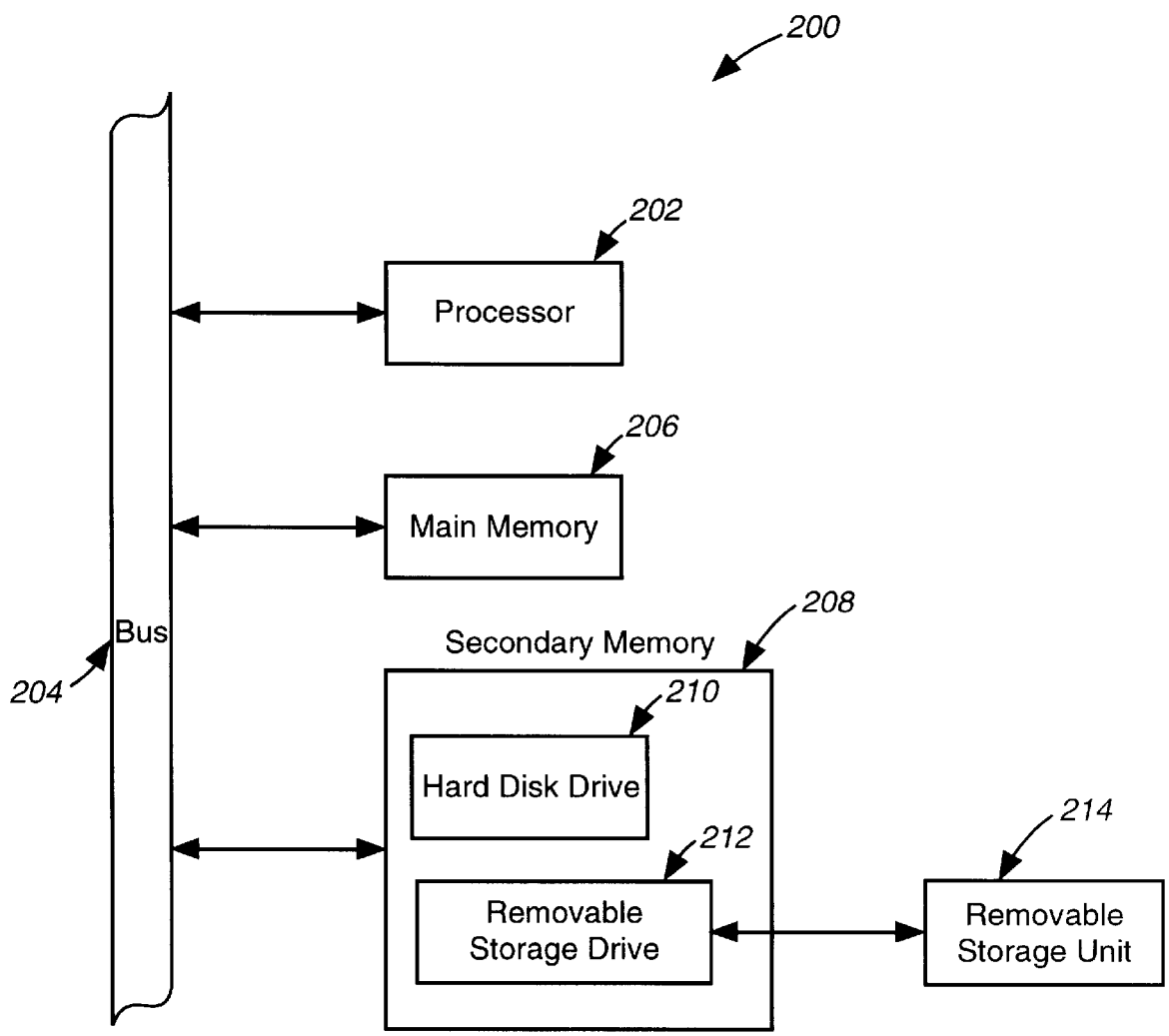
FIG. 2 is a block diagram of an exemplary computer system useful for implementing components of the present invention.

The client workstation 102 can be implemented using a computer system, such as the computer system 200 shown in FIG. 2. The computer system 200 includes one or more processors, such as processor 202. The processor 202 is connected to a communication bus 204.

The computer system 200 also includes a main memory 206, preferably random access memory (RAM), and a secondary memory 208. The secondary memory 208 includes, for example, a hard disk drive 210 and/or a removable storage drive 212, representing a floppy disk drive, a magnetic tape drive, a compact disk drive, etc. The removable storage drive 212 reads from and/or writes to a removable storage unit 214 in a well known manner.

Removable storage unit 214, also called a program storage device or a computer program product, represents a floppy disk, magnetic tape, compact disk, etc. The removable storage unit 214 includes a computer usable storage medium having stored therein computer software and/or data.

Computer programs (also called computer control logic) are stored in main memory and/or the secondary memory 208. Such computer programs, when executed, enable the computer system 200 to perform the features of the present invention as discussed herein. In particular, the computer programs, when executed, enable the processor 202 to perform the features of the present invention. Accordingly, such computer programs represent controllers of the computer system 200.

In another embodiment, the invention is directed to a computer program product comprising a computer readable medium having control logic (computer software) stored therein. The control logic, when executed by the processor 202, causes the processor 202 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art.

Operation of the Invention

The present invention is used to automate job exception system monitoring functions. The present invention provides a user-friendly graphical user interface (GUI) that allows a user to retrieve exceptions in all or selected data centers 104*a* . . . 104*c* to be reviewed. The present invention executes on the client workstation 102. A process flowchart 300 illustrating the main operation of the present invention is shown in FIG. 3.

For security purposes, the process begins, in step 302, by prompting the user to enter their user I.D. and password into the client workstation 102. This I.D. and password is the user's RACF (resource access control facility) I.D. and password. The client workstation 102 then logs the user into each of the data centers 104*a* . . . 104*c* supported by the system, using standard commands and the communications manager.

In step 304, the user is prompted to specify refresh options. Refresh options indicate the time in minutes for the client workstation 102 to screen all specified jobs at all specified data centers for exceptions and present them to the user. If the user does not specify a refresh value, a default value (i.e., 15 minutes) will be set. In step 306, the user is prompted to select the Data Centers 104*a* . . . 104*c* from which exceptions will be retrieved for monitoring. In step 308, the user is prompted to specify which type(s) of exception(s) to report. Examples of such exceptions include, but are not limited to, late conditions, JCL errors, system ABENDs, user ABENDs, skeleton status, waiting on resources, or return codes not equal to "0". A late condition exception is a job that appears late at a selected data center. A JCL error results when a job has a JCL conflict or error. System ABENDs are jobs that have abnormally ended due to a system problem. User ABENDs are jobs that have abnormally ended due to a user problem. Skeleton status are jobs that have been scheduled at a data center, but cannot be submitted due to resource issues. Waiting on resources refers to there being a lack of memory (i.e., RAM, disk, tape drive, etc.) and/or initiators to properly execute the job. Return codes refer to jobs that have completely executed, but result in abnormal return codes (i.e., return codes not equal to "0"). The user also has the option of selecting all exceptions to be reviewed. Although not shown in FIG. 3, the user can exit at any time by selecting an exit button. Once the user has entered all requested data (i.e., refresh, data centers and exception types), processing proceeds by selecting an OK button (not shown).

In step 310, a search for all exceptions is executed, per user specifications set in steps 304–308. Each data center specified in step 306 is accessed by logging into the job exception system. The job exception system identifies each exception according to the specifications given in step 308, and then sends those exceptions back to the client workstation 102. In step 312, the client workstation 102 displays the results of its search to the user. The user is provided a job exception report screen in step 314. The job exception report screen specifies the total number of exceptions found, along with the jobname, job exception system number, data center, data/time, and status of each exception found for each selected data center.

The user must now choose one of four options. The first option, in step 316, returns processing back to the previous screen, in step 304, where the user is prompted to enter a refresh option, data center option, and exception option as indicated above.

The second option, in step 318, provides the user with tools for searching through the results. These tools are very useful, since there may be hundreds of exceptions reported in step 314. The search through result process, in step 318, is shown in greater detail in FIG. 4.

Referring to FIG. 4, step 318 offers the user two options of searching through the results. The first option, in step 402, provides the user the ability to navigate through the screen of total exceptions found. The user can navigate through the list of exceptions by selecting the top 404, middle 406, or bottom 408 of this screen. The second option, in step 410, provides the user the ability to search for a particular job by entering a jobname. In step 412, the user enters the data centers in which to perform the search. In step 414, the search for the specified jobname from the list of all job exceptions found in step 310 is executed. The user may exit the search at any time in step 416.

Referring back to FIG. 3, the third option offered to the user, in step 320, allows the user to access specific job information about a job highlighted from the exceptions list, and at some point, gives the user the ability to react or perform various actions on that job. The process (in step 320) of accessing specific job information on a job is shown in greater detail in FIG. 5.

Referring to FIG. 5, after highlighting a particular job from the display in step 314, detailed information about this job exception is displayed in step 502. Some of the information is listed in 502a. The information includes the jobname; the data center 104 where the job executed; and various job exception system data, such as the job exception system number assigned to the selected job, the scheduling number assigned during job scheduling for the selected job to run under, date/time the selected job was submitted, date/time the selected job ended, the scheduling queue the selected job currently resides in, the number of requirements that exist for the selected job, the type of action used to submit the selected job, the current ABEND status for the selected job, and a list of the current requirements for the selected job.

In step 504, the status of requirements for the selected job are displayed. Such requirements are usually prerequisite jobs that need to be completed prior to starting the selected job, but may also include other actions. From here, a number of options for actions to take on a job are presented to the user. In step 506, the user may select the excepted job and take one of three actions. In step 508a, a notification is presented to a Productions Operations member that, along with identified requirements, the selected job also needs restarting. In step 508b, the user may select a requirement from the list displayed in step 504, and then post, or submit, this job using the job submit system. In step 508c, the user may create a requirement using the job exception system by specifying an action as a requirement for the selected job.

In step 510, the user is informed as to whether a notification has been performed for the selected job. Residing on each data center 104a . . . 104c is an Automated Notification System (ANS), such as that disclosed in copending application entitled "Autonotification," application Ser. No. 08/663,401, (Atty. Docket No. COS-94-036 (1575.0340000)) referred to above. The ANS monitors jobs for certain events, such as job failures, Abnormal Ends (ABENDs), or successful job completions. When such an event occurs, the ANS issues a notification to appropriate personnel. This notification may be in the form of a PMR, an E-mail, or a Page. When such notification occurs, the ANS creates a file containing the job name, along with the type of notification that was issued. The file can be accessed by the client workstation 102, where the file is queried as to whether a notification to the user has occurred and by what means (i.e., PMR 512a, E-Mail 512b, or Page 512c).

As previously stated, the user is given the ability to react or perform several options on the selected job. In step 514, the first option is an IOF option that issues a command to the data center 104 in which the job executed, to call up the IOF screen at that data center 104. This allows the user to view system log files and output files, which contain error messages, return codes, output data, and other pertinent information needed to analyze the cause of the exception.

In step 516, the second option is an edit JCL option that issues a command to the Data Center 104 in which the job executed, to call up the ISPF Edit utility for the job. This allows the user to edit the JCL of the job, if this is the appropriate action to take on the exception.

In step 518, the third option is the view doc option that issues a command to the data center 104 in which the job executed, to call up the documentation associated with the job. This documentation is a text file provided by the job's developers that provides useful information in analyzing and fixing the job's ABENDs.

In step 520, the fourth option is the issue PMR option. The issue PMR option allows the user to issue a PMR for the selected job. The client workstation 102 issues a command file that logs onto the Problem Management System 118, which resides on the operating system platform in one or more data centers 104a . . . 104c in the preferred embodiment. Alternatively, the Problem Management System 118 may reside on an external platform. The command file searches within the Problem Management System 118 for the selected job name to determine if a PMR exists for that job. If a PMR exists, it is presented to the user for viewing and modification. If a PMR does not exist, the user may create and submit one within the current environment.

In step 522, the fifth option allows the user to issue an e-mail message to a predetermined recipient for the purpose of notifying appropriate personnel of the job ABEND/exception. The client workstation 102 issues a command file that logs onto a program on the operating system of a data center 104 to access an external E-Mail System 114 in terminal mode. The user may then complete a script within the E-Mail System 114, notifying appropriate personnel of the exception. Alternatively, the command file may issue a command to the ANS to automatically issue an e-mail message, again using the external E-Mail System 114, to the appropriate personnel.

In step 524, the sixth option allows the user to issue an electronic page to a predetermined pager number for the purpose of notifying appropriate personnel of the job abend/exception. The client workstation 102 logs onto the operating system of the appropriate data center 104 and issues a command to the ANS. This command instructs the ANS to send a page to the appropriate pager number.

In step 526, the job actions option allows the user to take specific actions on a job, utilizing the job exception system and the job restart/resubmit system. In step 528, the user is presented with a customized Graphical User Interface (GUI) that allows the user to select from conventional CA-7 actions, such as placing a job on hold, adding a requirement to the job, requeuing the job, canceling the job, and forcing completion of the job. If the user selects the option to add a requirement, control will pass to the create job requirement dialog where the user is allowed to add a requirement by entering the requirement in the user entry field and selecting add requirement. To return to the job action options, the user can select the exit option. Returning to step 528, the GUI displays the job name, the job exception system number assigned to the job, the job entry subsystem number or operating system processing number that was assigned to the job, the reason why a job was canceled, placed on hold, or force completed, and the overall status of the job as it relates to the job exception system. The client workstation 102 then logs onto the operating system of the appropriate data center 104 and issues the user-selected commands to the job exception system.

In step 530, another customized GUI is presented to the user that allows the user to select conventional restart/resubmit actions, such as resubmitting the job and restarting the job. When restarting a job, the user must identify the starting point to restart the job and the ending point or last step that should be completed if the job is restarted. The user is also given the option of bypassing any generated data sets or pseudo code. The client workstation 102 then logs onto the operating system of the appropriate data center 104 and issues the user-selected restart commands to the job restart/resubmit system.

In step 532, the back option allows the user to navigate back to the previous screen. As a final option, in step 534, the user can exit the detailed job information screen and return to the exceptions list displayed in step 314. Referring back to FIG. 3, the fourth option offered to the user, in step 322, refreshes the screen displaying search results 314 by executing another search for exceptions, as indicated in step 310.

The present invention also contains an error report screen that displays the errors that occur after a call is made to "ALL" data centers 104a . . . 104c. The user has the option of displaying the errors in full text. To continue processing after the errors have been viewed, the user can select the continue option.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An automated batch management system, comprising:
a plurality of data centers, each of said data centers comprising one or more computers, each of said computers processing one or more batch jobs, wherein each of said data centers further comprises:
a scheduling system to schedule, submit, and start said batch jobs;
a job exception system to identify exceptions and abnormal ends (ABENDs) for said batch jobs;
an Interactive Output Facility (IOF) to view system log files and error messages on said batch jobs; and
an Interactive System Productivity Facility (ISPF) to edit said batch jobs;
a client workstation, interfaced to said plurality of data centers via standard data links, for monitoring said batch jobs, processed on said computers at each of said data centers, resulting in said exceptions and said ABENDs, wherein said client workstation includes a graphical user interface to allow a user to retrieve said batch jobs resulting in said exceptions and said ABENDs from said job exception system on each of said data centers and to utilize said IOF, said ISPF, and said scheduling system at each of said data centers to monitor, analyze, and fix said batch jobs resulting in said exceptions and said ABENDs from said client workstation; and
notification means for notifying personnel concerning said batch jobs resulting in said exceptions and said ABENDs, if necessary.

2. The system of claim 1, wherein said notification means includes an E-Mail System, connected to each of said data centers via standard data links, for notifying personnel via an e-mail message.

3. The system of claim 1, wherein said notification means includes a Paging System, connected to each of said data centers via standard data links, for notifying personnel via an electronic pager message.

4. The system of claim 1, further comprising a Program Management System, connected to each of said data centers via standard data links, for creating and housing Program Management Records (PMRs) for said batch jobs.

5. The system of claim 1, wherein said notification means includes an autonotification system, connected to each of said data centers via standard data links, for notifying personnel.

6. The system of claim 1, wherein each of said data centers further comprises an application gateway for providing access to said data centers that are remotely located.

7. An automated batch management system for monitoring the occurrence of exceptions and abnormal ends (ABENDs) while processing batch jobs on a plurality of computer systems, comprising:
security means for accessing said automated batch management system;
input means for specifying a refresh variable to update information displayed on a client workstation, data center locations in which to monitor, and types of exceptions to monitor;
retrieve means for retrieving said batch jobs that result in exceptions and ABENDs from each of said plurality of computer systems for said client workstation;
display means for displaying said batch jobs that result in exceptions and ABENDs on said client workstation;
selection means for selecting a batch job that results in exceptions or ABENDs to obtain detailed information on said selected batch job;
means for obtaining detailed information concerning said selected batch job;
notification means for notifying key personnel concerning said selected batch job; and
action means for performing job actions on said selected batch job, wherein said job actions include one or more of:
means for viewing system log files and error messages for said selected job;
means for editing job control language for said selected job;

means for retrieving documentation for said selected job;
means for creating a program management record for said selected job;
means for reviewing a program management record for said selected job;
means for reviewing prior notification for said selected job;
means for restarting said selected job;
means for resubmitting said selected job;
means for placing on hold said selected job;
means for creating requirements for said selected job;
means for requeuing said selected job;
means for canceling said selected job; and
means for force completing said selected job.

8. The system of claim 7, wherein means for notifying key personnel concerning said selected batch job includes one or more of:

notification using an E-Mail System;

notification using a Paging System; and notification by issuing a program management record using a Program Management System.

9. A method for automating a batch management system to monitor the occurrence of exceptions and abnormal ends (ABENDs) while processing batch jobs on a plurality of computer systems, the steps comprising:

accessing said automated batch management system using an I.D. and password;

specifying a refresh variable to update information displayed on a client workstation, data center locations in which to monitor, and types of exceptions to monitor;

retrieving said batch jobs that result in exceptions and ABENDs from each of said plurality of computer systems for said client workstation;

displaying said batch jobs that result in exceptions and ABENDs on said client workstation;

selecting a batch job that results in exceptions or ABENDs to obtain detailed information on said selected batch job;

obtaining detailed information concerning said selected batch job;

notifying key personnel concerning said selected batch job; and performing job actions on said selected batch job, wherein said job actions include one or more of:
viewing system log files and error messages for said selected job;
editing job control language for said selected job;
retrieving documentation for said selected job;
creating a program management record for said selected job;
reviewing a program management record for said selected job;
reviewing prior notification for said selected job;
restarting said selected job;
resubmitting said selected job;
placing on hold said selected job;
creating requirements for said selected job;
requeuing said selected job;
canceling said selected job; and
force completing said selected job.

10. The method of claim 9, wherein said step for notifying key personnel concerning said selected batch job includes one or more of the steps of:

notifying personnel using an E-Mail System;

notifying personnel using a Paging System; and notifying personnel by issuing a program management record using a Program Management System.

11. A computer program product for use within a multiuser data processing system environment, comprising:

a computer usable medium having computer readable program code means embodied in the medium for providing an automated batch management system within a networking environment for monitoring batch jobs, executing on a plurality of computer systems, for exceptions and abnormal ends during execution, the computer program product having:

computer readable code means for accessing said automated batch management system using an I.D. and password;

computer readable code means for specifying a refresh variable to update information displayed on a client workstation, data center locations in which to monitor, and types of exceptions to monitor;

computer readable code means for retrieving said batch jobs that result in exceptions and ABENDs from each of said plurality of computer systems for said client workstation;

computer readable code means for displaying said batch jobs that result in exceptions and ABENDs on said client workstation;

computer readable code means for selecting a batch job that results in exceptions or ABENDs to obtain detailed information on said selected batch job;

computer readable code means for obtaining detailed information concerning said selected batch job;

computer readable code means for notifying key personnel concerning said selected batch job; and computer readable code means for performing job actions on said selected batch job, wherein said job actions include one or more of:
viewing system log files and error messages for said selected job;
editing job control language for said selected job;
retrieving documentation for said selected job;
creating a program management record for said selected job;
reviewing a program management record for said selected job;
reviewing prior notification for said selected job;
restarting said selected job;
resubmitting said selected job;
placing on hold said selected job;
creating requirements for said selected job;
requeuing said selected job;
canceling said selected job; and
force completing said selected job.

* * * * *